US007659227B2

(12) United States Patent
Wolf (10) Patent No.: US 7,659,227 B2
(45) Date of Patent: Feb. 9, 2010

(54) CATALYSTS FOR HYDROGEN PRODUCTION

(75) Inventor: Eduardo Wolf, Granger, IN (US)

(73) Assignee: University of Notre Dame du Lac, Notre Dame, IN (US)

( * ) Notice: Subject to any disclaimer, the term of this patent is extended or adjusted under 35 U.S.C. 154(b) by 267 days.

(21) Appl. No.: 11/752,190

(22) Filed: May 22, 2007

(65) Prior Publication Data
US 2007/0269367 A1   Nov. 22, 2007

Related U.S. Application Data

(60) Provisional application No. 60/802,417, filed on May 22, 2006.

(51) Int. Cl.
*B01J 23/10* (2006.01)
(52) U.S. Cl. .................. 502/304; 502/307; 502/183; 502/184; 502/318; 502/343
(58) Field of Classification Search .................. None
See application file for complete search history.

(56) References Cited
U.S. PATENT DOCUMENTS
2002/0068843 A1   6/2002   Dai et al.
2004/0194384 A1*  10/2004  Nguyen .................. 48/197 R
FOREIGN PATENT DOCUMENTS
WO      02/47815 A1    6/2002
WO      02/47818 A1    6/2002
WO   2004/000453 A2   12/2003

OTHER PUBLICATIONS

Journal: Production of hydrogen from methanol over Cu/ZnO catalysts promoted by ZrO2 and Al2O3, Journal of catalysis 219, pp. 389-403, year 2003.*
Journal: Steam reforming of methanol of binary Cu/ZnO catalysts: Effects of preparation condition upon precursors, surface structure and catalytic activity, Journal of Molecular Catalysis A: Chemical 124 (1997) 123-136.*
Argell, J. et al., "Production of hydrogen from Methanol over Cu/ZnO catalysts promoted by ZrO2 and Al2O3," Journal of Catalysis 219 389-403, (2003).
Argell, Johan et al., "Production of hydrogen by partial oxidation of methanol over ZnO-supported palladium catalysts prepared by microemulsion technique," Applied Catalysis A: General 242 (2003) 233-245.

(Continued)

*Primary Examiner*—Melvin C Mayes
*Assistant Examiner*—Smita Patel
(74) *Attorney, Agent, or Firm*—Schwabe, Williamson & Wyatt (57) ABSTRACT

Embodiments of the present invention provide catalysts for production of hydrogen from methanol. In an embodiment, a Cu/Zn catalyst may be promoted by Zr and/or Ce, in addition to, in embodiments, Pd or another noble metal. In an embodiment, a chemical composition may have a Cu/Zn base catalyst with a promoter element of Ce, Zr, and/or Pd or another noble metal. Methods of producing hydrogen using such catalysts are also provided.

11 Claims, 4 Drawing Sheets

OTHER PUBLICATIONS

Alejo, L. et al., "Partial oxidation of methanol to produce hydrogen over Cu-Zn-baseed catalysts," Applied Catalysis A: General 162 (1997) 281-297.

Choi, Yongtaek et al., "Fuel cell grade hydrogen from methanol on a commercial Cu/ZnO/Al2O3 catalyst," Applied Catalysis B: Environmental 38 (2002) 259-269.

Cubeiro, M.L. et al., "Selective Production of Hydrogen by Partial Oxidation of Methanol over ZnO-Supported Palladium Catalysts," Journal of Catalysis 179, 150-162 (1998), Article No. CA982184.

Iwasa, Nobuhiro et al., "Effect of Zn addition to supported Pd catalysts in the steam reforming of methanol," Applied Catalysis A: General 248 (2003) 153-160.

Lindstrom, Bard et al., "Steam reforming of methanol over copper-based monoliths: the effects of zirconia doping," Journal of Power Sources 106 (2002) 264-273.

Liu, Yanyong et al., "Highly active copper/ceria catalysts for steam reforming of methanol," Applied Catalysis A: General 248 (2002) 137-145.

Reitz, T.L. et al., "Characterization of CuO/ZnO under oxidizing conditions for the oxidative methanol reforming reaction," Journal of Molecular Catalysis A: Chemical 162 (2000) 275-285.

Shen, Guo-Chen et al., "Steam reforming of methanol on binary Cu/Zno catalysts: Effects of preparation condition upon precursors, surface structure and catalytic activity," Journal of Molecular Catalysis A: Chemical 124 (1997) 123-136.

Velu, S. et al., "Oxidative Steam Reforming of Methanol over CuZnAl(Zr)-Oxide Catalysts for the Selective Production of Hydrogen for Fuel Cells: Catalyst Characterization and Performance Evaluation," Journal of Catalysis 194, 373-384 (2000).

* cited by examiner

CATALYSTS FOR HYDROGEN PRODUCTION

CROSS REFERENCE TO RELATED APPLICATIONS

The present application claims priority to U.S. Provisional Patent Application No. 60/802,417, filed May 22, 2006, entitled "Catalytic Cartridge for Hydrogen Production," the entire disclosure of which is hereby incorporated by reference in its entirety.

TECHNICAL FIELD

Embodiments of the present invention relate to the field of hydrogen production, and, more specifically, to catalysts and methods of using such catalysts for producing hydrogen.

BACKGROUND

The use of hydrogen as a localized energy source for fuel cell powered vehicles or small electronic devices is a topic of great interest. Fuel cells are efficient, with zero point of use emissions of nitrogen oxides ($NO_x$), carbon monoxide (CO), volatile organic compounds (VOCs), and particulate matter. Hydrogen can be extracted from sources including natural gas, water, biomass, or other more complex hydrocarbons. Despite the numerous advantages that fuel cells provide, there are significant difficulties in practice including hydrogen transportation, storage and handling. An alternative solution to problems associated with storing molecular hydrogen involves use of hydrogen stored in a liquid hydrocarbon that can be reformed on board to facilitate production of hydrogen. Methanol is an abundant commodity chemical that can be stored as a liquid at ambient temperatures and shows promise as a localized hydrogen source. Research on methanol reforming has focused primarily on four overall catalytic methanol-reforming reactions, identified in Table 1.

TABLE 1

Methanol reforming reactions. All heats of reaction are in kJ/mol.

| Equation | Reaction | $\Delta H(g^*)$ | $\Delta H(l^{**})$ | $\Delta H(l)/H_2$ | $H_2/C$ |
|---|---|---|---|---|---|
| 1 | $CH_3OH \leftrightarrow 2H_2 + CO$ | 91 | 128 | 64 | 2 |
| 2 | $CH_3OH + H_2O \leftrightarrow 3H_2 + CO_2$ | 50 | 131 | 44 | 3 |
| 3 | $CH_3OH + \frac{1}{2}O_2 \leftrightarrow 2H_2 + CO_2$ | −192 | −155 | −77 | 2 |
| 4 | $4CH_3OH + \frac{1}{2}O_2 + 3H_2O \leftrightarrow 11H_2 + 4CO_2$ | −44 | 238 | 22 | 2.75 |

*All species are gas phase
**Includes heat of vaporization for $CH_3OH$ and $H_2O$ The first reaction (Equation 1) is the basic methanol decomposition reaction yielding hydrogen and CO. This reaction is not suitable for fuel cell use because proton exchange membrane (PEM) cells, which use precious metals for catalysts, require hydrogen feed containing less than 50 ppm CO to avoid catalyst poisoning. Steam reforming (Equation 2) has the highest hydrogen to carbon ratio. However, this reaction is highly endothermic, not suitable for applications where a heat source is unavailable or bursts of energy may be needed. Partial oxidation (Equation 3) is exothermic, with a higher reaction rate than steam reforming and reduced tendency to form CO. Finally, combined methanol reforming (Equation 4) is a combination of steam reforming and partial oxidation. This reaction offers a balance between hydrogen to carbon ratio and heat of reaction but may be more difficult to control.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

In embodiments, catalysts containing copper (Cu) and zinc (Zn) promoted with cerium (Ce), zirconium (Zr), and/or palladium (Pd) are shown to be both active and selective for the partial oxidation of methanol. This represents the first time various amounts of Zr or Ce and/or Pd have been added to Cu/Zn catalysts for study under partial oxidation conditions.

The catalysts were evaluated in a two-stage high throughput experimentation process. First, catalysts were evaluated based on temperature rise as a result of the exothermic reaction, detected by an infrared camera. Second, a more detailed kinetic study capable of detecting both activity and selectivity was carried out in a single flow tubular reactor.

Embodiments of the present invention provide catalysts for production of hydrogen from methanol. In an embodiment, a Cu/Zn catalyst may be promoted by Zr and/or Ce, in addition to, in embodiments, Pd or other noble metals. In an embodiment, a chemical composition may have a Cu/Zn base catalyst with a promoter element of Ce, Zr, and/or Pd (or another noble metal such as platinum (Pt) or rhodium (Rh)). In an embodiment, suitable catalysts may have a generic formula $(m)Cu/(n)Zn/(d)Ce/(p)Zr-(r)Pd$, where $m=5-8$, $n=2-5$, $d=0-2$, $p=0-2$, and $r=0-2$. In an embodiment, at least one of d and p are not zero. The numbers for m, n, d, and p establish the molar ratios among those four elements, whereas the number (s) for r identify the weight percentage of Pd with respect to the entire catalyst. The use of molar ratios for certain elements and weight percentage of Pd (or another noble metal) is done to better represent the small amounts of noble metal (such as about 1-2 weight %) that may be used while still representing the values using whole numbers.

As indicated above, while Pd is used in the provided examples, other noble metals may used, such as Pt or Rh.

In an embodiment, the activity and selectivity for partial oxidation of methanol to $H_2$ and $CO_2$ on Zr and/or Ce promoted Cu/Zn or Cu/Zn/Pd catalysts may be analyzed using a high throughput method of screening and analysis. In an embodiment, infrared thermography may be used as a descriptor of overall catalytic activity. Activity and selectivity of samples with a high infrared signal may be measured in a flow reactor and characterized by the Brunauer-Emmett-Teller model (BET), X-ray diffraction (XRD), and/or X-ray photoelectron spectroscopy (XPS).

In an embodiment, a reaction model may be used to select families of materials to be studied. In accordance with an embodiment, in the first stage of screening, infrared thermography (IRT) may be utilized to determine catalytic activity, which is related to the temperature increase of individual catalyst spots in a reactor. In an exothermic reaction, such as methanol partial oxidation, the more active catalysts exhibit higher temperature and emit more infrared radiation. In the next stage, catalysts that show strong activity under IRT conditions may be evaluated in a parallel fixed bed flow reactor and then the most active and selective may be studied in a single flow reactor. Characterization of the most active catalysts may be performed using a variety of tools, including nitrogen BET surface area measurement, X-ray diffraction (XRD), and X-ray photoelectron spectroscopy (XPS) studies.

In an embodiment of the present invention, a methanol partial oxidation reaction, which has a complex reaction mechanism that may involve a variety of methanol reforming reactions (see Table 1) as well as others, such as the water gas shift reaction, may be targeted for production of hydrogen promoted by various catalysts.

In an embodiment, an appropriate kinetic model includes several competing reactions. For example, studies of methanol partial oxidation indicate that several reactions participate including combustion, decomposition, steam reforming, and water gas shift. Clearly, in an embodiment of the invention, all four overall reforming reactions are closely linked, and should be considered when studying the partial oxidation reaction.

Partial oxidation of methanol has been studied over a variety of catalyst compositions including Pd on ZnO, Pd on $ZrO_2$, Ni on silica, Cu:ZnO, Cu:ZnO:$Al_2O_3$, Cu:Zn, and Cu:Zn:$SiO_2$. In embodiments, noble metals such as Pd are active in methanol reforming and have been used in steam reforming producing very low CO selectivity. Hydrogen selectivity of 96% at a methanol conversion of 70% has been achieved with a Pd catalyst supported by ZnO. However, CO selectivity was high (>20%) under the reaction conditions. CO selectivity of less than 10% was obtained over Cu containing catalysts. However, these CO concentrations are still several orders of magnitude higher than what is needed for PEM fuel cell operation.

In an embodiment, copper may be included as a component of the catalysts due to its high activity and reduced tendency for formation of CO. Further, in embodiments, zinc may be added to the catalysts as zinc provides catalyst structure. In embodiments, various promoters, such as Ce, Zr, and Pd (or other noble metals, for example, Pt or Rh), may be added to the catalysts to increase performance.

In an embodiment, a catalyst library was developed containing 20 exemplary catalysts that are based on a model of a multi-component catalyst with sites for methanol conversion and sites for oxidative conversion. To catalyze methanol reforming, Cu and/or Zn form the basis, with addition of Ce and/or Zr as promoters, and, in some embodiments, Pd to enhance oxidation. The first 12 catalysts of the library contain variable molar ratios of Cu/Zn starting at 5/5 to 8/2 in three groups with 0.0%, 1.0%, and 2.0% by weight Pd (Cu-1 to Cu-12). The remaining 8 catalysts have a Cu/Zn ratio fixed at 7/3, which was found to be a favorable Cu/Zn ratio during IRT tests of the first 12 catalysts. Of the remaining eight, four have varying concentrations of either Ce or Zr (Cu/M equal to 7/1 and 7/2) with 1% by weight Pd. Two more have Ce or Zr in weight fractions of one, without Pd. The final two have Ce/Zr in a 1/1 molar ratio with and without Pd.

An infrared thermography (IRT) reactor measures the in situ catalytic activity of up to 50 catalyst compositions depending on the reactor size utilized. The camera (such as a Thermovision 782) detects infrared radiation emitted from each catalyst sample during an exothermic reaction with a precision capable of discerning 0.1° C. temperature differences. Relative catalytic activity is determined as a function of reactor temperature using careful temperature calibrations of blank runs and background subtraction. In an embodiment, excess reactant may flow over individual catalyst wells placed in an IR transparent holder and arranged in a circular array, each containing, for example, approximately 5 mg of catalyst. In an exemplary embodiment, nitrogen may flow at 150 cc/min through a saturator containing A.C.S. spectrophotometric grade 99.9% methanol (Sigma-Aldrich) maintained at 0° C., resulting in a stream nominally containing 3.7% methanol. In an embodiment, pure oxygen may be added to the feed stream at a rate of 2.8 cc/min, yielding an $O_2/CH_3OH$ ratio of 0.5 at atmospheric pressure. Due to the large exothermic nature of the methanol partial oxidation reaction, significant temperature differentials may be detected under reaction conditions.

Catalysts showing high thermal activity during IRT experimentation may be selected for further analysis in a parallel flow reactor and then in even greater detail using a single fixed-bed tubular reactor. Such a tubular reactor may be made of quartz with an internal diameter of, for example, 10.5 mm and may be thermally controlled by an electric heater. The reactor temperature may be monitored and controlled using a K-type thermocouple (+/−1° C.) placed in the center of the catalyst bed connected to a temperature controller.

In an exemplary embodiment, calcined catalysts were first pressed at 5000 psi for 4 minutes. The resulting pellet was then broken and sieved to obtain a particle size between 0.6 and 1 mm. A mass of 200 mg sieved catalyst was used in each experiment supported by quartz wool inside the reactor tube. Each catalyst was reduced in situ by heating from room temperature at a rate of 4.5° C./min to 300° C. and held for three hours. Reduction took place under a pure hydrogen flow rate of 50 cc/min. Reactant flow rate in this instance was 140 cc/min of nitrogen saturated with methanol at 0° C., resulting in a stream containing 3.7% methanol. Oxygen may also be added to the reactant stream at a rate of 2.8 cc/min yielding an $O_2/CH_3OH$ ratio of 0.5. An overall pressure of <0.5 psi was carefully maintained inside the reactor to provide constant pressure in the gas chromatography sampling system. Two gas chromatographs were connected in parallel to analyze the reactor effluent gasses. The first (Varian 3300) contained a 12' HAYESEP Q column for separation and detection of $CO_2$, methanol, and water. The second (Varian 920) contained a 6' molecular sieve 5A and 15' HAYESEP D connected in series capable of separating $O_2$, $H_2$, and CO. After reduction, the flow was switched from hydrogen to nitrogen as the reactor cooled to room temperature over the course of about 30 minutes. Product gases were measured in 12-minute intervals while the catalyst bed was heated from room temperature to 300° C. over the course of 3 hours.

In an embodiment, a Quantachrom Corporation Monosorb unit that utilizes a dynamic technique with a thermal conductivity cell for measuring desorption of nitrogen was used to determine BET area. In an embodiment, a mixture of 30% nitrogen and 70% helium may be used as both carrier and adsorbent gas. Catalysts analyzed in the BET were calcined and had a particle size sieved between 0.6 mm and 1 mm (except zirconia, used as a reference). The resulting particles were precisely weighed, and out-gassed for two hours at a temperature of 250° C. no other pretreatment procedures were carried out before BET measurement.

Catalyst powders analyzed via XPS and XRD were pretreated by calcination only. The X-ray diffractometer was from Scintag Inc., which used Cu—Kα radiation at a wavelength of 0.1540562 nm. Scanning parameters included 2θ scans from 25 to 60 degrees with a step size of 0.02 degrees and a 3 second dwell time. XPS was done using a Kratos XSAM 800 with a monochromatic Al—Kα X-ray source operating at 1486.6 eV and a takeoff angle fixed at 90 degrees. The powder samples were adhered to the sample stubs with conductive carbon tape and placed in a vacuum chamber with pressure lower than $2 \times 10^{-8}$ torr.

In embodiments, catalysts were prepared via the co-precipitation method using soluble metal precursors. In an embodiment, nitrates of Cu, Zn, Ce, and Zr may be provided in proper fractions to yield a 0.1M total metal ion concentration in solution after being added to water. Pd nitrate was added on a weight percent basis of the other metal oxides. The nitrates were allowed to dissolve over the course of one hour while being heated to 40° C. and stirred at 400 rpm. Heating and stirring conditions were maintained while 50 ml of 0.5M $Na_2CO_3$ was added at a rate of 1 ml per minute to precipitate the metal from aqueous solution. The resulting slurry was aged for 30 minutes. Next, the precipitate was filtered and thoroughly washed to minimize residual Na ions, followed by drying at 100° C. overnight. Finally, the catalyst was ground into a fine powder using a mortar and calcined in air at 500° C. for 5 hours.

Calcined catalysts were analyzed via BET, XPS, and XRD as described previously. Results from these experiments including BET area, Cu/M ratio on the catalyst surface, and resulting bulk concentration of metal, are summarized in Table 2.

TABLE 2

Summary of data from BET/XRD/XPS

| Catalyst | Preparation mole % | | | | | BET area | XPS surface molar ratio | | | | XRD Mole % | | | | |
|---|---|---|---|---|---|---|---|---|---|---|---|---|---|---|---|
| Cu/Zn/Ce/Zr—Pd | Cu | Zn | Ce | Zr | Pd* | m²/g | Cu/Zn | Cu/Ce | Cu/Zr | Cu/Pd | Cu | Zn | Ce | Zr | Pd* |
| 5/5/0/0-0 | 50 | 50 | 0 | 0 | 0 | 16 | 0.3 | — | — | — | 50 | 50 | 0 | 0 | — |
| 7/3/0/0-1 | 70 | 30 | 0 | 0 | 1 | 34 | 0.7 | — | — | 250 | 72 | 28 | 0 | 0 | — |
| 7/3/0/1-1 | 64 | 27 | 0 | 9 | 1 | 60 | 1 | — | 10 | ** | 84 | 13 | 0 | 4 | — |
| 7/3/1/0-1 | 64 | 27 | 9 | 0 | 1 | 38 | 0.8 | 5 | — | 1.4 | 77 | 19 | 4 | 0 | — |
| 7/3/1/1-0 | 58 | 25 | 8 | 8 | 0 | 81 | 0.7 | 5 | 5 | — | 80 | 10 | 7 | 3 | — |
| Ceria | 0 | 0 | 100 | 0 | 0 | 17 | — | — | — | — | — | — | — | — | — |
| Zirconia | 0 | 0 | 0 | 100 | 0 | 52 | — | — | — | — | — | — | — | — | — |

*Pd prepared on a weight percent based on metal oxides
** Pd peaks could not be quantified for catalysts containing Zr XRD patterns of the calcined samples (not shown) indicate distinct separate oxide phases of the catalytic components prior to reduction and reaction. Change from oxide phases to metallic upon reduction in hydrogen, and formation of Cu/Zn alloys under reduction in CO or during methanol decomposition reaction conditions have been reported. The XRD results in Table 2 also show a higher concentration of Cu when Ce or Zr is added, roughly 15% to 20% relative to the concentration initially present in solution. It is assumed that during preparation the presence of Ce or Zr decreases the solubility of Zn resulting in enrichment of Cu in the precipitated solid. XPS results show Zn in a much higher proportion on the surface by a factor of three or more, when compared to the bulk.

Due to its low concentration, XRD results did not reveal any peaks that could be attributed to Pd, thus it was not taken into account for the XRD analysis. Similarly, catalyst samples containing Zr made quantification of Pd peaks impossible by XPS because the Pd 3d doublet overlaps with the intense Zr 3p peak. XPS results show a significant enrichment of Pd on the surface when Ce is added, from Cu/Pd of 250 to 1.4.

Total surface area as measured by BET is also enhanced by addition of Cu, Ce, or Zr ranging from 16 $m^2$/g in the 7Cu/3Zn-1Pd catalyst to 81 $m^2$/g in the 7Cu/3Zn/1Ce/1Zr catalyst. Addition of Zr seems to increase the surface area by a greater amount than Ce, which is not surprising since Zr enriches Cu on the surface more than Ce.

The 20 specific prepared catalysts mentioned above were evaluated by IRT in three experiments, each array containing up to 9 catalysts. A $\Delta T$ was observed for each catalyst before and during reaction, at constant reactor temperatures of both 225° C. and 250° C. Due to the large exothermic nature of the partial oxidation of methanol reaction, (−192 kJ/mol of $CH_3OH$ reacted) the active catalysts had a large, easily observed, $\Delta T$. Results from the IRT experiments are presented for all 20 catalysts in FIG. 1 and FIG. 2. The smallest $\Delta T$ observed during the IRT experiments was 2° C., still easily detectable by the IR camera, which has 0.1° C. precision capability. All catalysts except for one (7Cu/3Zn/1Zr-1Pd) showed a trend of increasing $\Delta T$ with increasing reactor temperature from 225° C. to 250° C.

Figure 1:
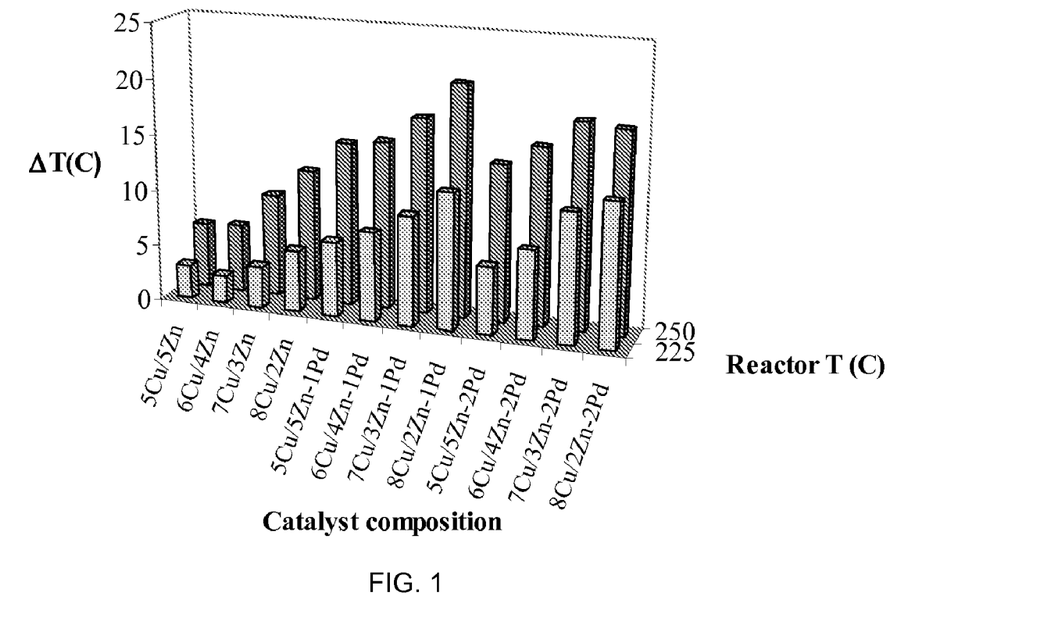
FIG. 1 illustrates a plot of observed catalytic activity ΔT vs. catalyst compositions; Cu/Zn ratio from 5/5 to 8/2 and Pd metal in 0.0%, 1.0%, and 2.0% (weight percent relative to metal oxides) at reactor temperatures 225° C. and 250° C. in accordance with various embodiments of the present invention.

The first set of results displayed in FIG. 1 shows the effect of changing the Cu/Zn ratio from 5/5 to 8/2 and the effect of adding Pd metal in 0.0%, 1.0%, and 2.0% (weight percent relative to metal oxides) to each of those, resulting in 12 catalyst combinations. Clearly, increasing the Cu/Zn ratio results in an increase in $\Delta T$, regardless of Pd metal loading. The increase is roughly 5° C. between 5Cu/5Zn and 8Cu/2Zn catalysts, for all three Pd metal loadings, and both reactor temperatures. The addition of Pd metal also has a significant effect on the observed $\Delta T$, though changing Pd loading from 1.0% to 2.0% yields no significant change in $\Delta T$ given the same Cu/Zn ratio.

Figure 2:
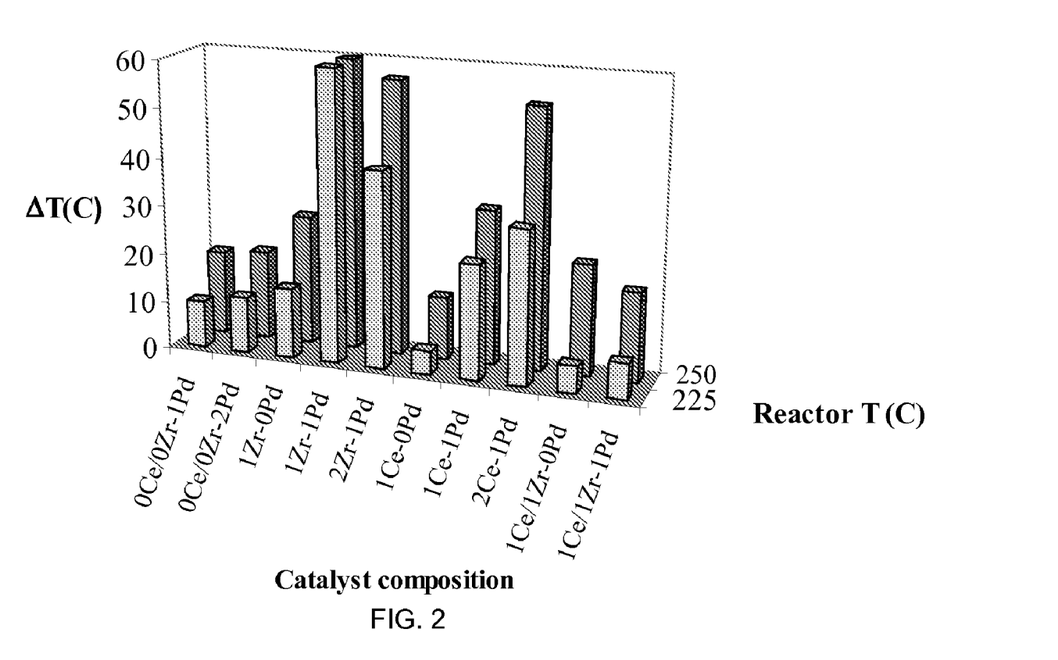
FIG. 2 illustrates a plot of observed catalytic activity ΔT vs. catalyst compositions; Cu/Zn fixed at 7/3 with variable additions of Ce, Zr, and Pd at reactor temperatures 225° C. and 250° C.

The results shown in FIG. 2 demonstrate effects of addition of Ce and Zr to the Cu/Zn base. The remaining 8 catalysts in the library were prepared with a Cu/Zn ratio of 7/3 at a Pd loading of 1.0% with Ce and/or Zr added in a ratio Cu/M equal to 7/1 and 7/2. The addition of Ce or Zr, especially when enhanced with Pd, had a pronounced effect on $\Delta T$. Although, when both Ce and Zr are added, the activity enhancement was less than when a single promoter was added. Addition of Zr yields the highest observed $\Delta T$ of the 20 catalysts. Additional Zr does not show a significantly increased $\Delta T$. Promotion of the catalyst by Ce also yielded significant improvement in observed $\Delta T$, with addition of two parts Ce being better than one. As shown in the Cu/Zn—Pd catalysts, the $\Delta T$ was greatly enhanced through addition of just a small amount of Pd, except for those catalysts containing both Ce and Zr.

Six catalysts were selected for exemplary detailed activity and selectivity measurements based on the performance in the IRT reactor at 250° C. The compositions studied include 7Cu/3Zn-1Pd, 7Cu/3Zn/1Zr-1Pd, 7Cu/3Zn/2Zr-1Pd, 7Cu/3Zn/1Ce-1Pd, 7Cu/3Zn/2Ce-1Pd, and 7Cu/3Zn/1Ce/1Zr-1Pd. For each experiment, 200 mg of the sieved catalyst was reduced in situ under hydrogen at a flow rate of 50 cc/min. Reactant flow rate in this instance was 140 cc/min of nitrogen saturated with methanol at 0° C., resulting in a stream containing 3.7% methanol. Pure oxygen was also added to the stream at a rate of 2.7 cc/min, yielding an $O_2/CH_3OH$ ratio of 0.5.

Figure 3:
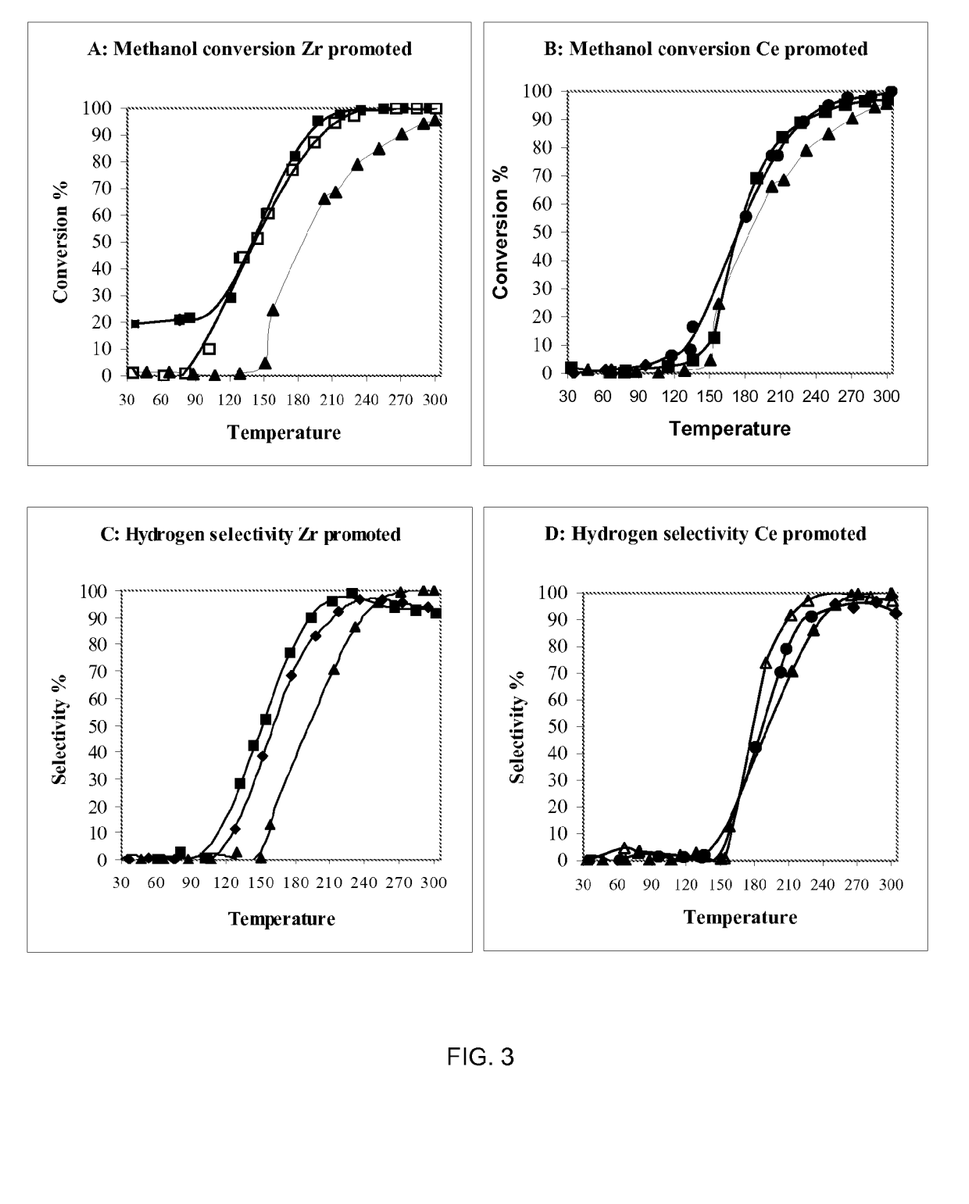
FIG. 3 illustrates a series of graphs of methanol conversion and hydrogen selectivity vs. temperature showing effect of Zr and Ce promotion with catalysts with the generic formula Cu/Zn/Ce/Zr—Pd more specifically indicated with various symbols as follows:, ■ 7Cu/3Zn/0Ce/1Zr-1Pd, ☐ 7Cu/3Zn/0Ce/2Zr-1Pd, ▲ 7Cu/3Zn/0Ce/0Zr-1Pd, Δ 7Cu/3Zn/2Ce-1Pd, and ● 7Cu/3Zn/1Ce-1Pd.
Figure 4:
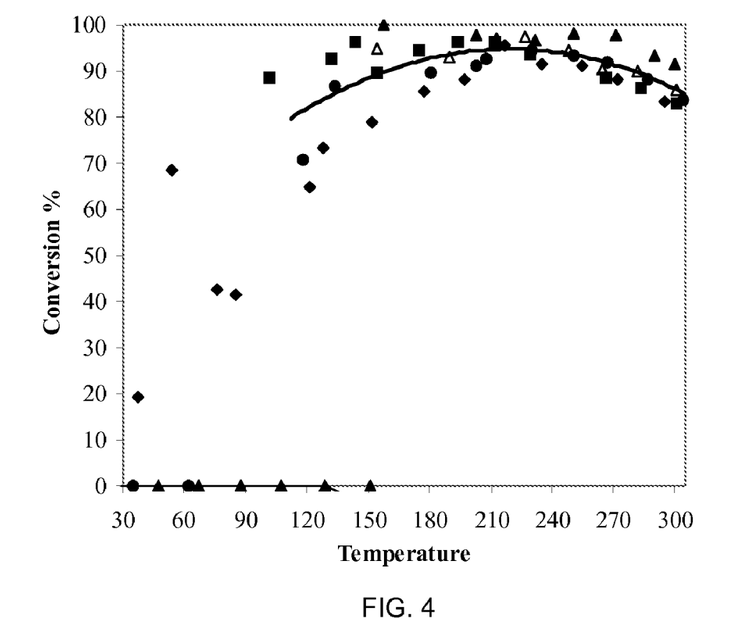
FIG. 4 illustrates carbon dioxide selectivity plotted vs. reaction temperature for catalysts indicated with various symbols as follows: ■ 7Cu/3Zn/1Zr-1Pd, ▲ 7Cu/3Zn-1Pd, ☐ 7Cu/3Zn/2Zr-1Pd, ● 7Cu/3Zn/1Ce-1Pd, and Δ 7Cu/3Zn/2Ce-1Pd.

The six catalysts studied attained high methanol conversion rates, as shown in FIGS. 3 and 4, reaching 90%+ at 200° C. FIG. 3 shows that addition of Zr enhances conversion of the basic Cu/Zn—Pd catalyst. Addition of 1 part Zr results in auto-ignition however adding more Zr did not display this characteristic. Consumption of oxygen reached 100% for all catalysts studied at a temperature of roughly 150° C. The results also indicate a dependence regarding oxygen partial pressure and hydrogen selectivity. The profiles of the most active catalysts show an S shaped curve through the temperature ramp with the less active catalysts showing a steeper middle slope. This steep slope may indicate a change in the nature of the catalyst surface to match what is already present in the more active catalysts. Changing catalyst preparation may have an effect on reducibility, with CuO reduction temperature ranging from 230 to 477° C. measured by temperature-programmed reduction (TPR) depending on the preparation method.

FIG. 3 shows the effect of Ce promotion on the Cu/Zn—Pd catalyst. Hydrogen selectivity increased along with methanol conversion as reaction temperature increased before reaching a plateau when methanol conversion approached 100%. Between 250 and 300° C., maximum hydrogen selectivity was observed to be between 99% for catalyst 7Cu/3Zn-1Pd and 96% for 7Cu/3Zn/1Ce-1Pd. Below 175° C. catalyst 7Cu/3Zn/1Zr-1Pd exhibited the highest hydrogen selectivity, it also had the highest methanol conversion throughout the reaction profile.

$H_2$ selectivity >95% was provided by a catalyst promoted with Zr at 100% methanol conversion. In an embodiment, catalysts promoted with 10% Zr showed $H_2$ selectivity >95% with methanol conversion approaching 100% at ~200° C. The most active catalyst was also promoted with Zr and achieved 100% methanol conversion at 225° C.

Thus, in an embodiment, a zirconium promoter produces higher hydrogen selectivity than cerium using a low reaction temperature, although either Zr or Ce are suitable promoters.

In FIG. 4, $CO_2$ selectivity is plotted against reaction temperature with a single trend line through the data in the upper temperature region. A significant amount of carbon dioxide and water was detected in the low temperature regions where methanol conversion is <70%. This indicates that combustion processes may be dominating the reaction at lower temperatures. The Zr promoted catalyst rapidly approaches a plateau starting at 200° C. of roughly 95% hydrogen selectivity. This result is interesting since the $CO_2$ selectivity increases much less dramatically between 100 and 200° C., where both hydrogen selectivity and methanol conversion are rapidly increasing, possibly due to the water gas shift reaction. CO formation completes the carbon balance, yielding a concentration less than 6000 ppm for all catalysts studied. Catalyst promoted with zirconia 7Cu/3Zn/1Zr achieved 1400 ppm CO at 100% methanol conversion and 92% hydrogen selectivity.

Hydrogen selectivity in an embodiment of the present invention may be approximately 95% at 100% methanol conversion, which corresponds to a production rate of ~3100 cc $H_2$/g-hr.

Embodiments of the present invention provide catalysts capable of achieving CO levels of less than 500 ppm, such as less than 200 ppm. Additional processing steps may also be utilized to further reduce the CO content in a separate stage catalyst reaction.

Figure 5:
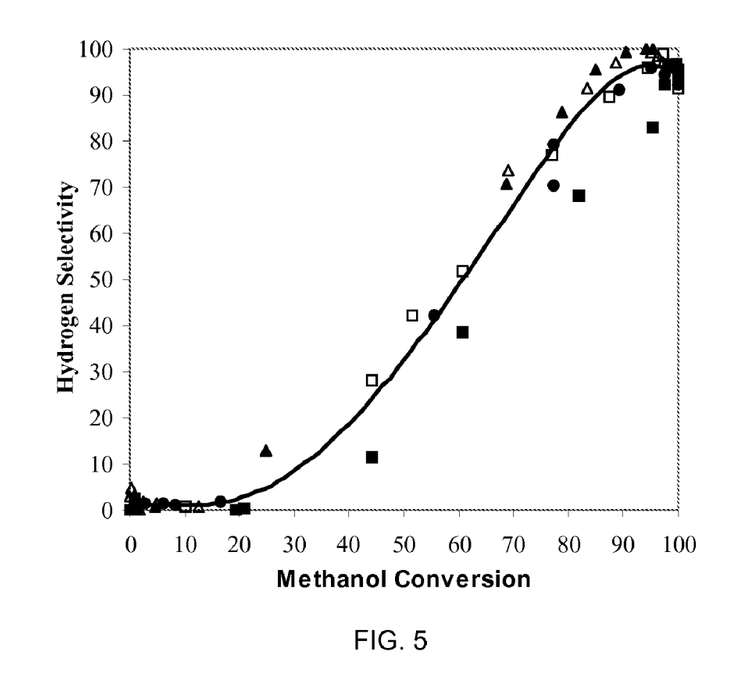
FIG. 5 illustrates hydrogen selectivity plotted vs. methanol conversion for catalysts indicated with various symbols as follows: ■ 7Cu/3Zn/1Zr-1Pd, ▲ 7Cu/3Zn-1Pd, ☐ 7Cu/3Zn/2Zr-1Pd, ● 7Cu/3Zn/1Ce-1Pd, and Δ 7Cu/3Zn/2Ce-1P.

Hydrogen selectivity vs. methanol conversion is plotted in FIG. 5. A single trend line shows similar dependence of hydrogen selectivity on methanol conversion for all catalysts. Three distinct regions can be seen in FIG. 5. In the low methanol conversion region, below approximately 20% there is almost no hydrogen formation, likely due to the reaction being dominated by complete combustion. Next, in the region from 30% to 80% methanol conversion, a roughly linear dependence is seen as combustion processes yield to other reactions possibly involving methanol decomposition and water gas shift. The last region of methanol conversion from 80% to 100% yields a decreasing slope, turning negative at conversion >95% as reverse water gas shift products (increased CO and $H_2O$) begin to form. Thus, in an embodiment, a suitable operation range for all catalysts under the reaction conditions studied is ~95% conversion.

The two most active catalysts mentioned above (7Cu/3Zn/1Zr-1Pd, and 7Cu/3Zn/2Zr-1Pd) correspond to the top two most active catalysts from IRT, showing good agreement between IRT and reaction results.

Data from catalyst characterization summarized in Table 2 shows the addition of Ce or Zr enhances the concentration of copper on the surface relative to Zn. In embodiments, catalysts with higher $Cu°$ surface areas generally have higher catalytic activity. Similarly, the more active $Pd^{o+}$ was maintained by $Zr^{4+}$ ion modification due to acid sites in the support. Therefore, the high activity of the catalysts at low temperatures of 7Cu/3Zn/2Ce-1Pd, 7Cu/3Zn/1Zr-1Pd, and 7Cu/3Zn/2Zr-1Pd may be due to enhancement of Cu and/or Pd on the surface. In addition, in embodiments the use of metal alloys may result in increased activity and selectivity as compared to those containing separate metallic phases.

As stated previously, there is a potential for several reactions to compete simultaneously under partial oxidation conditions, including all four overall methanol reforming reactions. When considering the results previously discussed, the dramatic change in reaction product distribution as a function of temperature agrees with previous results in that several reaction mechanisms are competing and the dominant one is dependent upon the temperature and/or other reaction conditions. The water gas shift reaction may also play a role in the reaction pathway.

Figure 6:
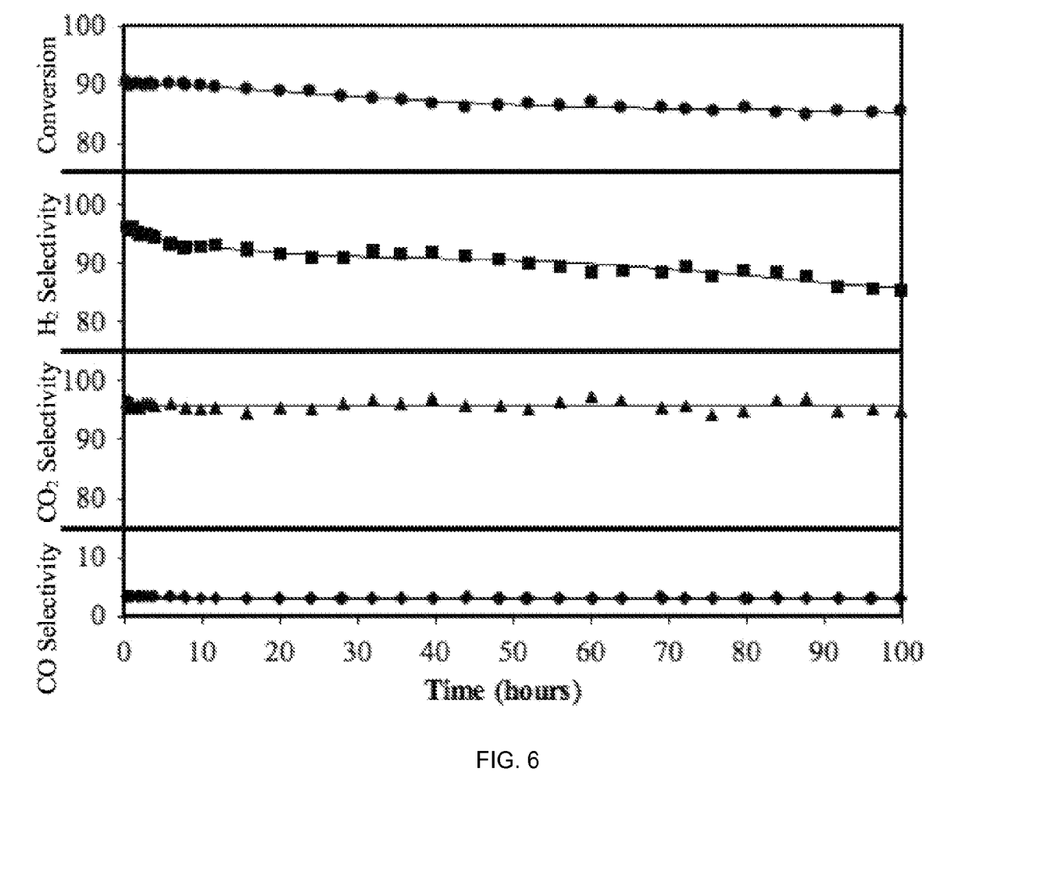
FIG. 6 illustrates the results of a test the durability or resistance to deactivation of various catalysts over a period of 100 hours.

In an embodiment, a test of the catalysts durability or resistance to deactivation was carried out for 100 hours under the same conditions as the experiments previously described. 200 mg of catalysts were first reduced in hydrogen at a flow rate of 50 cc/min. The reactant flow rate was 140 cc/min of nitrogen saturated with methanol at 0° C., resulting in a stream containing 3.7% methanol. Oxygen was added at a rate of 2.8 cc/min, yielding an oxygen/methane ratio of 0.5. Product gases were measured in ~4 hour intervals (more frequently during the first 10 hours). The results presented in FIG. 6 indicate that during the 100 hrs of time on stream the conversion of methanol decreased from about 90% to about 85% and the hydrogen selectivity decreased from about 95% to about 90%. $CO_2$ and CO selectivity increased 1-2% during the run. Thus, the developed catalysts show a strong resistance to deactivation.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A chemical composition, comprising:
    a Cu/Zn base catalyst; and
    at least one reformation promoter selected from Ce and Zr, wherein the base catalyst and reformation promoter together have a formula (m)Cu/(n)Zn/(d)Ce/(p)Zr, wherein m=5-8, n=2-5, d=0-2, and p=0-2, but d and p are not both 0, and wherein m, n, d, and p define molar ratios of Cu, Zn, Ce, and Zr.

2. The chemical composition of claim 1, further comprising Pd as an oxidation promoter.

3. The chemical composition of claim 2, wherein Pd is included in an amount of about 1-2 weight percent.

4. The chemical composition of claim 1, further comprising Pt as an oxidation promoter.

5. The chemical composition of claim 1, further comprising Rh as an oxidation promoter.

6. The chemical composition of claim 1, wherein the Cu/Zn base catalyst comprises a molar ratio of Cu/Zn of 8/2.

7. The chemical composition of claim 1, wherein the Cu/Zn base catalyst comprises a molar ratio of Cu/Zn of 7/3.

8. The chemical composition of claim 7, wherein the composition has the following formula (7)Cu/(3)Zn/(1)Ce, with about 1-2 weight percent of a noble metal.

9. The chemical composition of claim 7, wherein the composition has the following formula (7)Cu/(3)Zn/(2)Ce, with about 1-2 weight percent of a noble metal.

10. The chemical composition of claim 7, wherein the composition has the following formula (7)Cu/(3)Zn/(1)Zr, with about 1-2 weight percent of a noble metal.

11. The chemical composition of claim 7, wherein the composition has the following formula (7)Cu/(3)Zn/(2)Zr, with about 1-2 weight percent of a noble metal.

* * * * *